US008330750B2

(12) United States Patent
Oku

(10) Patent No.: US 8,330,750 B2
(45) Date of Patent: Dec. 11, 2012

(54) LIQUID CRYSTAL DRIVE DEVICE AND LIQUID CRYSTAL DISPLAY DEVICE USING THE SAME

(75) Inventor: Hironori Oku, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 552 days.

(21) Appl. No.: 12/529,940

(22) PCT Filed: Mar. 4, 2008

(86) PCT No.: PCT/JP2008/053813

§ 371 (c)(1), (2), (4) Date: Sep. 4, 2009

(87) PCT Pub. No.: WO2008/108353

PCT Pub. Date: Sep. 12, 2008

(65) Prior Publication Data

US 2010/0097361 A1 Apr. 22, 2010

(30) Foreign Application Priority Data

Mar. 8, 2007 (JP) ................................ 2007-058157

(51) Int. Cl.
*G06F 3/038* (2006.01)

(52) U.S. Cl. .......................... 345/209; 345/96; 345/208

(58) Field of Classification Search .................. 345/209, 345/208, 96
See application file for complete search history.

(56) References Cited

U.S. PATENT DOCUMENTS

| | | | | |
|---|---|---|---|---|
| 6,232,948 | B1 | 5/2001 | Tsuchi | |
| 2004/0263446 | A1 * | 12/2004 | Kawase et al. | 345/87 |
| 2006/0238473 | A1 | 10/2006 | Hashimoto | |
| 2008/0122823 | A1 * | 5/2008 | Kim et al. | 345/211 |

FOREIGN PATENT DOCUMENTS

| | | |
|---|---|---|
| JP | 10-301539 | 11/1998 |
| JP | 2002-215112 | 7/2002 |
| JP | 2005-024583 | 1/2005 |
| JP | 2005-300625 | 10/2005 |
| JP | 2006-310989 | 11/2006 |

* cited by examiner

*Primary Examiner* — Kevin M Nguyen
*Assistant Examiner* — Kenneth B Lee, Jr.
(74) *Attorney, Agent, or Firm* — Fish & Richardson P.C.

(57) ABSTRACT

A liquid crystal drive device (200) is configured so that a source driver (20) or a common driver (30) performs voltage application using a power voltage VDDH prior to voltage application using a boosted voltage 2VDDH upon application of a source voltage VS and high-level transition of a common voltage VCOM.

12 Claims, 9 Drawing Sheets

LIQUID CRYSTAL DRIVE DEVICE AND LIQUID CRYSTAL DISPLAY DEVICE USING THE SAME

TECHNICAL FIELD

The present invention relates to a liquid crystal drive device driving a liquid crystal display panel of an active matrix type, and to a liquid crystal display device employing such a liquid crystal drive device.

BACKGROUND ART

In these days, liquid crystal display devices are widely and commonly used as devices for displaying letters and images. In particular, liquid crystal display devices that are provided with a liquid crystal display panel of the active matrix type, in which a desired pixel is turned on/off by performing on/off control of a switching device (such as a TFT [thin film transistor]) formed in each pixel, have become the mainstream of liquid crystal display devices because of its high contrast performance and its high-speed display performance.

FIG. 9 is a circuit diagram showing an example of a conventional source driver that applies a source voltage VS to a liquid crystal display panel of the active matrix type.

As shown in FIG. 9, the conventional source driver generates a twice-boosted voltage 2VDDH (e.g., 5.6 [V]) from a supply voltage VDDH (e.g., 2.8 [V]) supplied from outside, and then, by use of this, drives a source amplifier AMP 1 to generate a source voltage VS (e.g., 0 to 4 [V]) corresponding to a halftone value (e.g., 0 to 255) of input data, and then applies it to the liquid crystal display panel (in FIG. 9, a panel load Z).

FIG. 10 is a diagram illustrating the conventional pulse drive of the source voltage VS. In an upper part of the diagram, there are shown a gate voltage application period and a source voltage application period in a first horizontal period 1H in an Nth frame and in an (N+1)th frame; in a lower part, the voltage waveform of the source voltage VS is shown.

As shown in FIG. 10, the conventional source driver applies the source voltage VS from the source amplifier AMP1 to the liquid crystal display panel through out the gate selection period.

FIG. 11 is a circuit diagram showing an example of a conventional common driver that applies a common voltage VCOM to the liquid crystal display panel of the active matrix type.

As shown in FIG. 11, the conventional common driver has a positive common amplifier AMP2 generating a predetermined positive voltage VCOMH (e.g., 3.6 [V]) by use of the boosted voltage 2VDDH, and a negative common amplifier AMP3 generating a negative voltage VCOML (e.g., –1 [V]) by use of the supply voltage VDDH, in which one of the positive voltage VCOMH, a reference voltage VSS (a ground voltage GND), and the negative voltage VCOML is selectively applied so that the polarity of the common voltage VCOM is reversed at every horizontal period (e.g., 40 to 50 [<s]) (a so-called common AC drive system).

For example, in a 2.2 inch QVGA [quarter video graphics array] liquid crystal display panel, a load capacity of about 11 [nF] is periodically applied with the common voltage VCOM with an amplitude of about 5 [V], so that the load capacity is repeatedly charged and discharged.

FIG. 12 is a diagram illustrating the conventional pulse drive of the common voltage VCOM, and shows the voltage waveform of the common voltage VCOM.

As shown in FIG. 12, the conventional common driver has ternary drive system in which the reference voltage VSS (the ground voltage GND) is gone through on high-level transition and low-level transition of the common voltage VCOM.

As an example of a conventional technology related to the above description, Patent Document 1 discloses a drive circuit for a liquid crystal display device that includes multiple-value voltage generation means generating a plurality of voltages; a selection circuit selecting, from the voltages generated by the multiple-value voltage generation means, a voltage required for driving; and an output circuit is fed with the voltage selected by the selection circuit and outputting a desired voltage to a drive circuit output terminal, in which the output circuit includes an output circuit input terminal to which the voltage selected by the selection circuit is fed; the drive circuit output terminal; a first voltage source; a second voltage source; a first switch connected between the output circuit input terminal and the drive circuit output terminal; a transistor of which the drain is connected to the first voltage source, the gate is connected to the output circuit input terminal, and the source is connected to the drive circuit output terminal; and a second switch connected in between the drive circuit output terminal and the second voltage source.

Patent Document 1: JP-A-10-301539 Publication

DISCLOSURE OF THE INVENTION

Problems to be Solved by the Invention

It is true that, with the conventional source driver and the common driver described above, desired source voltage VS and the common voltage VCOM can be applied to a liquid crystal display panel of the active matrix type.

However, as shown in FIG. 10, the conventional source driver applies the source voltage VS from the source amplifier AMP1 to the liquid crystal display panel through out the gate selection period, and, on application of the source voltage VS, a current in proportion to the voltage difference between the reference voltage VSS (the ground voltage GND) and the source voltage VS corresponding to the halftone value of input data passes through the source amplifier AMP1, leading to higher electric power consumption due to charging of the load capacity. In particular, since the source amplifier AMP1 is driven by use of the twice-boosted voltage 2VDDH and its current consumption is equivalent to twice the apparent value, it has been causing increased electric power consumption of the source driver.

On the other hand, as shown in FIG. 12, the conventional common driver uses a ternary drive system in which the reference voltage VSS (ground voltage GND) is gone through on high-level transition (the level transition from the negative voltage VCOML to the positive voltage VCOMH) of the common voltage VCOM; however, even with this configuration, a current in proportion to the voltage difference between the reference voltage VSS (the ground voltage GND) and the positive voltage VCOMH passes through the positive common amplifier AMP2, leading to higher electric power consumption due to charging of the load capacity. In particular, since the positive common amplifier AMP2 is driven by use of the twice-boosted voltage 2VDDH and its current consumption is equivalent to twice the apparent value, it has been causing increased electric power consumption of the common driver.

The conventional technology disclosed in Patent Document 1 is similar to the present invention in terms of providing a precharge period of the load capacity. However, there is no suggestion or mention of the presence of a boosting circuit generating the boosted voltage 2VDDH from the supply voltage VDDH or of proper use of the supply voltage VDDH and the boosted voltage 2VDDH; moreover, in the conventional technology disclosed in Patent Document 1, since an operation amplifier 7 (corresponding to the source amplifier and the common amplifier in the present invention) in FIG. 16 in the document is intentionally excluded, the present invention and the conventional technology disclosed in Patent Document 1 can be regarded as having configurations fundamentally different.

In view of the inconveniences described above, it is an object of the present invention to provide a liquid crystal drive device that can reduce its electric power consumption and a liquid crystal display device employing such a liquid crystal drive device.

Means for Solving the Problem

To achieve the above object, according to the present invention, a liquid crystal drive device comprises a gate driver applying a gate voltage to a liquid crystal display panel of an active matrix type; a source driver applying a source voltage to the liquid crystal display panel; a common driver applying a common voltage to the liquid crystal display panel; and a boosting circuit generating a desired boosted voltage from a supply voltage, in which, on application of the source voltage and high-level transition of the common voltage, at least one of the source driver and the common driver performs voltage application using the supply voltage, prior to voltage application using the boosted voltage (a first aspect).

In the liquid crystal drive device according to the above-described first aspect, the source driver may comprise a source amplifier generating a data voltage according to the halftone value of input data by use of the boosted voltage; a buffer amplifier generating a predetermined precharge voltage by use of the supply voltage; and a selector selectively applying one of the data voltage and the precharge voltage to the liquid crystal display panel, in which, on application of the source voltage, the selector may apply the precharge voltage, for a predetermined period, prior to application of the data voltage (second aspect).

In the liquid crystal drive device according to the above-described second aspect, the source driver may reverse the polarity of the source voltage at every frame (third aspect).

In the liquid crystal drive device according to the above-described second or third aspect, the source driver may comprise, as the buffer amplifier, a plurality of them as means for generating a plurality of different precharge voltages by use of the supply voltage, and the selector may select, according to the halftone value of the input data, a precharge voltage to be applied prior to the data voltage (fourth aspect).

In the liquid crystal drive device according to the above-described first aspect, the common driver may comprise a positive common amplifier generating a predetermined positive voltage by use of the boosted voltage; a negative common amplifier generating a predetermined negative voltage by use of the supply voltage; and a selector selectively applying one of the positive voltage, the supply voltage, a ground voltage, and the negative voltage to the liquid crystal display panel, in which, on high-level transition of the common voltage, the selector may apply the ground voltage and the supply voltage one after the other, each for a predetermined period, prior to application of the positive voltage (fifth aspect).

In the liquid crystal drive device according to the above-described fifth aspect, on low-level transition of the common voltage, the selector may apply the supply voltage and the ground voltage one after the other, each for a predetermined period, prior to application of the negative voltage (sixth aspect).

In the liquid crystal drive device according to the above-described fifth or sixth aspect, the selector may comprise, as switching means for conducting/interrupting conduction between the application terminal of the supply voltage and the output terminal of the common voltage, a first p-channel field effect transistor of which the drain is connected to the output terminal of the common voltage and the backgate is connected to the application terminal of the positive voltage, and a second p-channel field effect transistor of which the drain is connected to the source of the first p-channel field effect transistor and the source and the backgate are connected to the application terminal of the supply voltage (seventh aspect).

According to the present invention, a liquid crystal display device comprises a liquid crystal display panel of the active matrix type and, as means for driving the liquid crystal display panel, the liquid crystal drive device according to any one of the above-described first to seventh aspects.

Advantages of the Invention

With a liquid crystal drive device and a liquid crystal display device employing such a liquid crystal drive device according to the present invention, it is possible to minimize voltage application (charging of the load capacity) from a circuit operating with a boosted voltage to a liquid crystal display panel and thereby reduce its electric power consumption

LIST OF REFERENCE SYMBOLS

Figure 1:
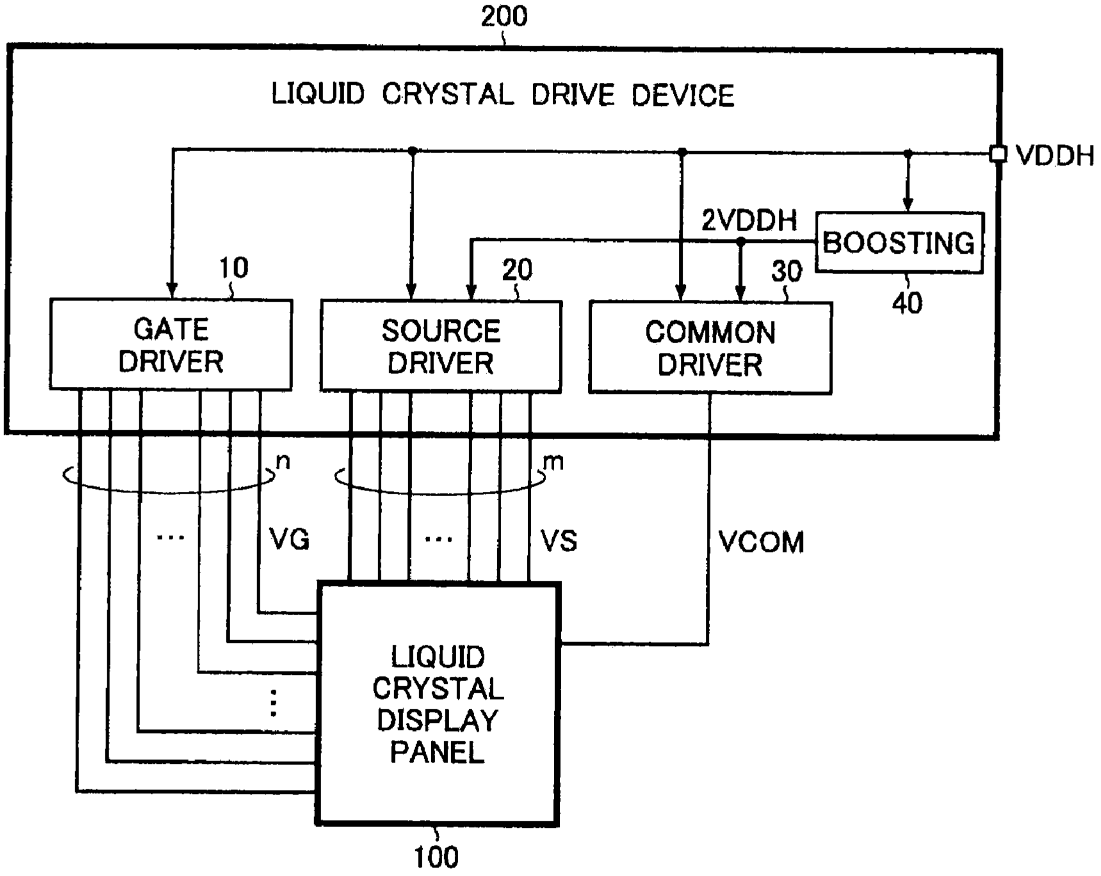
FIG. 1 A block diagram showing an embodiment of a liquid crystal display device according to the present invention.

10 Gate driver
20 Source driver
21 Gamma voltage generating portion
22, 22-1 to **22-*m*** Digital/analog converters (DACs)
23, 23-1 to **23-*m*** Source amplifiers
24-1, 24-2 Buffer amplifiers
25, 25-1 to **25-*m*** Selectors

30 Common driver
31 Positive common amplifier
32 Negative common amplifier
33 Selector
40 Boosting circuit
100 Liquid crystal display panel
200 Liquid crystal drive device
SW1 to SW4 Switches
SW5 to SW8 Switches
P1, P2, P3 P-channel field effect transistors
N1, N2 N-channel field effect transistors
VG Gate voltage
VS, VS1 to VSm Source voltages
VCOM Common voltage
VDAT, VDAT1 to VDATm Data voltages
VLP1, VLP2 Precharge voltages
VDDH Supply voltage
2VDDH Boosted voltage
VSS Reference voltage (ground voltage GND)
G0 to G255 Gamma voltage
VCOMH Positive voltage
VCOML Negative voltage

Best Mode for Carrying Out the Invention

FIG. 1 is a block diagram showing an embodiment of a liquid crystal display device according to the present invention.

As shown in FIG. 1, the liquid crystal display device of the embodiment has a liquid crystal display panel 100 and a liquid crystal drive device 200 which is driving means for driving the liquid crystal display panel 100.

The liquid crystal display panel 100 is means that is provided with liquid crystal cells each at different intersections of m (m≧2) source lines (data lines) and n (n≧2) gate lines (scan lines) perpendicular to the source lines, and that, by performing on/off control of a switching device (such as a TFT [thin film transistor]) formed in each liquid crystal cell, variably controls the voltage applied across a corresponding liquid crystal cell, so that the inclination of liquid crystal molecules is changed and thereby the transmissvity of light is controlled to display desired letters and images.

Using such a liquid crystal display panel 100 of the active matrix type makes it possible, compared with when a passive matrix type is used, to surely turn on individual pixels and thereby achieve high-contrast and high-response-speed display performances.

The liquid crystal drive device 200 is a semiconductor device integrating a gate driver 10 that applies n gate voltages VG to the liquid crystal display panel 100; a source driver 20 that applies m source voltages VS to the liquid crystal display panel 100; a common driver 30 that applies a common voltage VCOM to the liquid crystal display panel 100; and a boosting circuit 40 that generates a desired boosted voltage 2VDDH (in the embodiment, 5.6 [V]) from the supply voltage VDDH (in the embodiment, 2.8 [V]) supplied from outside.

The gate driver 10, as the n gate voltages VG, drives the liquid crystal display panel 100 such that all the gate lines are scanned successively by applying a selection voltage to a gate line of a selected row, and applying a non-selection voltage to a gate line of an unselected row. With respect to the configuration and the operation of the gate driver 10, known technology can be applied, and thus no detailed description will be given.

Next, the configuration and the operation of the source driver 20 will be described in detail.

Figure 2:
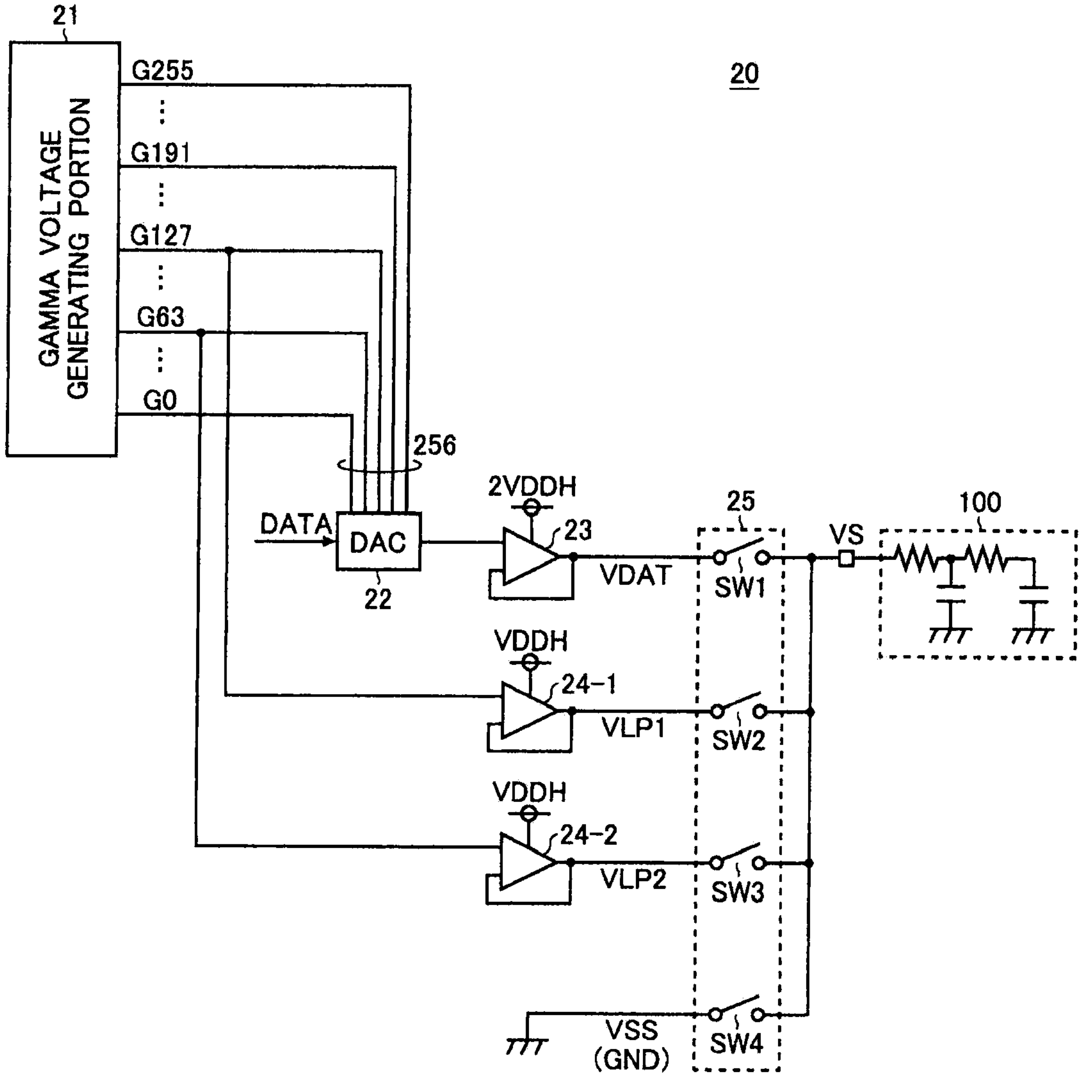
FIG. 2 A circuit diagram showing an example of the configuration of a source driver 20.

FIG. 2 is a circuit diagram showing an example of the configuration of the source driver 20.

As shown in FIG. 2, the source driver 20 of the configuration example has a gamma voltage generating portion 21, a digital/analog converter 22 (hereinafter referred to as the DAC [digital/analog converter] 22), a source amplifier 23, a buffer amplifier 24-1, a buffer amplifier 24-2, and a selector 25.

The gamma voltage generating portion 21 is means for generating 255 ($=2^8$)-value gamma voltages G0 to G255 required for x bit (in the embodiment, x=8) digital/analog conversion processing.

The DAC 22 is means for selecting one of the gamma voltages G0 to G 255, according to digital input data with an 8-bit halftone value, and sending it as analog output data.

The source amplifier 23 is means that is driven by the boosted voltage 2VDDH and is for generating, by buffering/amplifying the analog output data (one of the gamma voltages G0 to G255), a data voltage VDAT corresponding to the halftone value of the digital input data.

Figure 3:
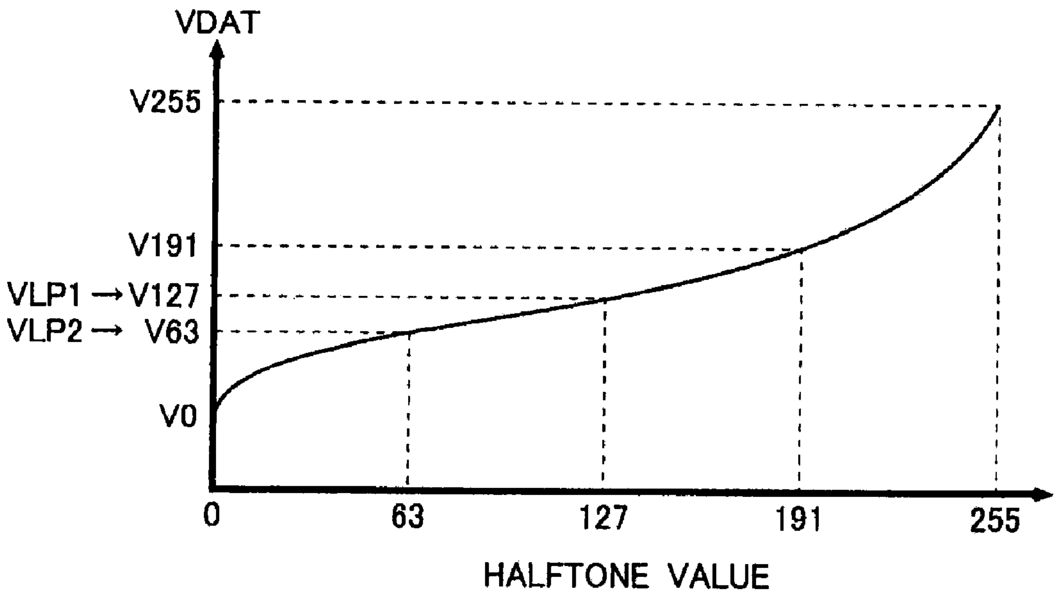
FIG. 3 A diagram illustrating a gamma characteristic of a data voltage VDAT.

FIG. 3 is a diagram illustrating a gamma characteristic of the data voltage VDAT.

As shown in FIG. 3, the source amplifier 23 outputs, corresponding to the halftone values 0 to 255 of the digital input data, the data voltage VDAT with a voltage value of V0 (e.g., 0.8 [V]) to V255 (e.g., 4 [V]).

On the other hand, the buffer amplifier 24-1 is means that is driven by the supply voltage VDDH and is for generating, by buffering/amplifying the gamma voltage G127, a first precharge voltage VLP1 (low-impedance output) corresponding to the halftone value of 127, which is half of the maximum halftone value of 255 of the digital input data.

Moreover, the buffer amplifier 24-2 is means that is driven by the supply voltage VDDH and is for generating, by buffering/amplifying the gamma voltage G63, a second precharge voltage VLP2 (low-impedance output) corresponding to the halftone value of 63, which is half of the middle halftone value of 127 of the digital input data.

The selector 25 is means for selectively applying one of the data voltage VDAT, the first precharge voltage VLP1, the second precharge voltage VLP2, and the reference voltage VSS (the ground voltage GND) described above to the liquid crystal display panel 100, and has switches SW1 to SW4. The switch SW1 is means for conducting/interrupting conduction between the application terminal (the output terminal of the source amplifier 23) of the data voltage VDAT and the output terminal of the source voltage VS. The switch SW2 is means for conducting/interrupting conduction between the application terminal (the output terminal of the buffer amplifier 24-1) of the first precharge voltage VLP1 and the output terminal of the source voltage VS. The switch SW3 is means for conducting/interrupting conduction between the application terminal (the output terminal of the buffer amplifier 24-2) of the second precharge voltage VLP2 and the output terminal of the source voltage VS. The switch SW4 is means for conducting/interrupting conduction between the application terminal of the reference voltage VSS (the ground voltage GND) and the output terminal of the source voltage VS.

In FIG. 2, the liquid crystal display panel 100 is shown as a panel load composed of the conduction resistance of the source lines, the ON resistance of the switching devices, the pixel capacitance of the liquid crystal cells, and another composite capacitance.

Figure 4:
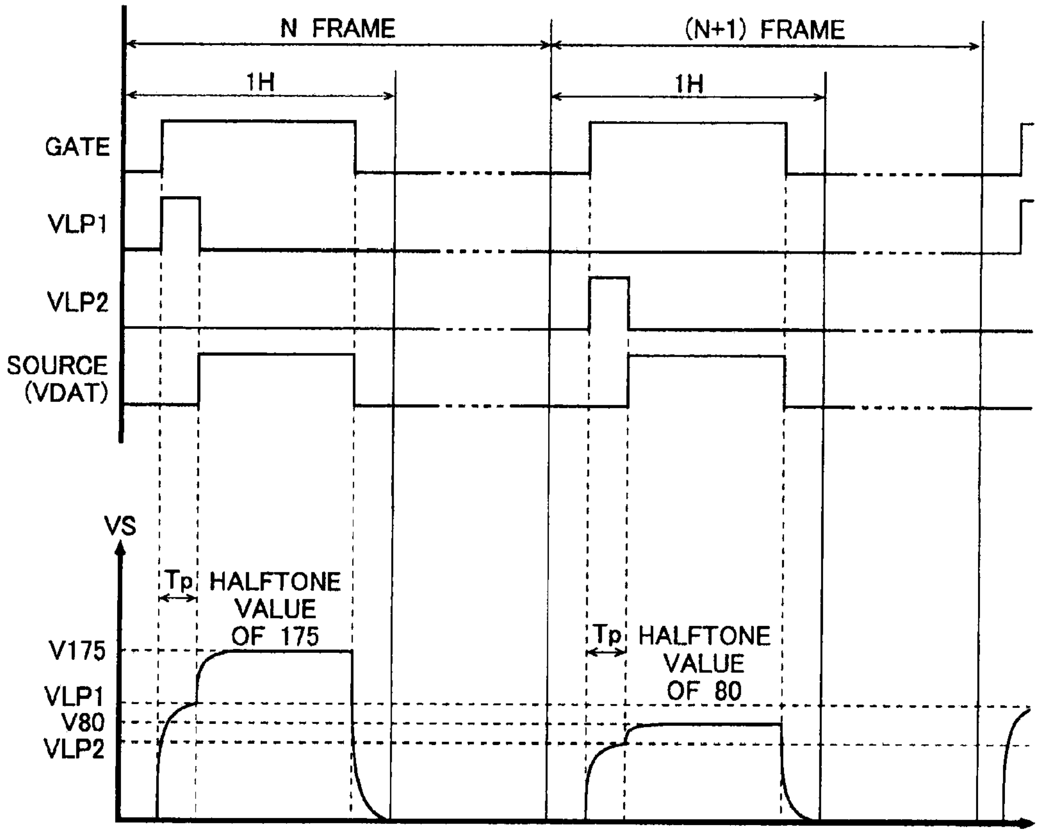
FIG. 4 A diagram illustrating the pulse drive of a source voltage VS.

FIG. 4 is a diagram illustrating pulse drive of the source voltage VS. In an upper part of the diagram, there are shown a gate voltage application period, a first precharge voltage application period, a second precharge voltage application period, and a data voltage application period in a first horizontal period 1H in an Nth frame and in an (N+1)th frame; in a lower part, the voltage waveform of the source voltage VS is shown.

As shown in FIG. 4, during the gate selection period, the source driver 20 of the embodiment applies the first precharge voltage VLP1 or the second precharge voltage VLP2 from the buffer amplifier 24-1 or the buffer amplifier 24-2, respectively, prior to application of the data voltage VDAT from the source amplifier 23.

Specifically, on application of the source voltage VS to the liquid crystal display panel 100, prior to application of the data voltage VDAT generated by use of the boosted voltage 2VDDH, the selector 25 applies, for a predetermined precharge period Tp, the first or second precharge voltage VLP1 or VLP2 generated by use of the supply voltage VDDH; thus, the source amplifier 23 simply needs to charge the voltage difference between the first or second precharge voltage VLP1 or VLP2 and the data voltage VDAT.

With this configuration, it is possible to minimize voltage application (charging of the load capacity) from the source amplifier 23, driven by the boosted voltage 2VDDH, to the liquid crystal display panel 100 and thereby reduce its electric power consumption.

With respect to the precharge period Tp mentioned above, so long as a desired voltage can be applied to the liquid crystal display panel 100 on completion of the gate selection period, it may be set to any length.

In particular, with a configuration in which the precharge period Tp is arbitrarily adjustable by use of a resister or the like, it is possible to enhance usability. For example, in view of the source voltage VS rising bluntly when the load capacity of the liquid crystal display panel 100 is large, the precharge period Tp may be set longer.

In the source driver 20 of the embodiment, the selector 25 selects, according to the halftone value of digital input data, the precharge voltage VLP1 or VLP2 to be applied prior to the data voltage VDAT.

Specifically, when the most significant bit of the digital input data is "1", its halftone value is 128 or more, and thus the selector 25 selects the first precharge voltage VLP1 (see the precharge behavior of the source voltage VS (corresponding to the halftone value of 175) in the Nth frame in a lower part of FIG. 4). On the other hand, when the most significant bit of the digital input data is "0", since its halftone value is 127 or less, the selector 25 selects the second precharge voltage VLP2 (see the precharge behavior of the source voltage VS (corresponding to the halftone value of 80) in the (N+1)th frame in the lower part of FIG. 4).

With this configuration, no unnecessarily high precharge voltage is applied prior to application of the data voltage VDAT; thus, it is possible to further reduce electric power consumption.

The levels of the first and second precharge voltages VLP1 and VLP2 can be set arbitrary; in the source driver 20 of the embodiment, optimal levels are set in view of a configuration (a so called source AC drive system) being adopted in which the polarity of the source voltage VS is reversed at every frame to prevent image persistence in the liquid crystal display panel 100.

More specifically, in the source driver 20 of the source AC drive system, when displaying an image (a still image in particular) according to the digital input data with an 8-bit halftone value, the source voltage VS is applied so as to always cross the middle halftone value of 127 between adjacent N frame and (N+1) frame. Thus, in the source driver 20 of the embodiment, the first precharge voltage VLP1 is set to a voltage level corresponding to the middle halftone value of 127 just mentioned, and the second precharge voltage VLP2 is set to a voltage level half of the first precharge voltage VLP1.

Figure 5:
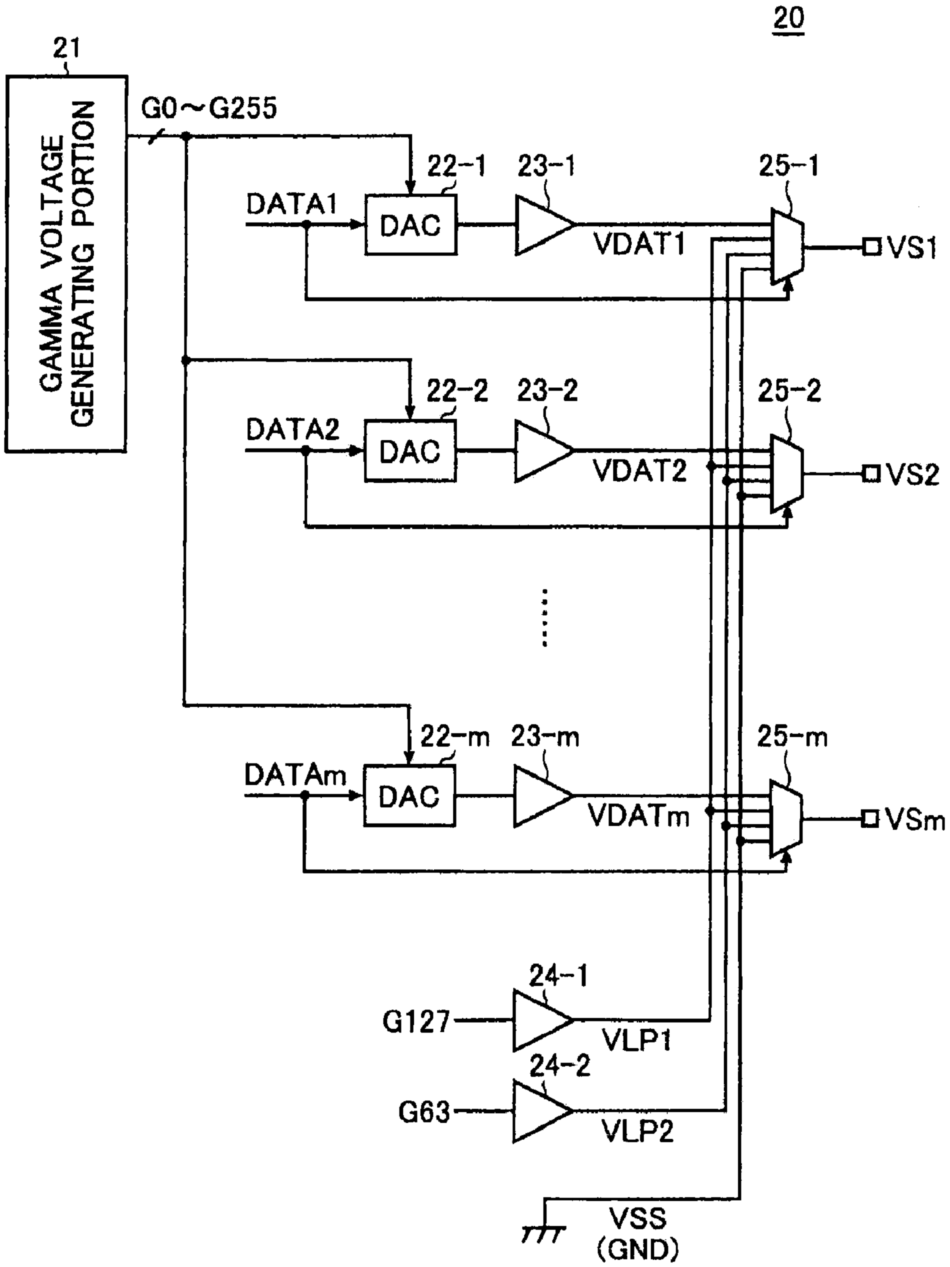
FIG. 5 A circuit diagram showing the whole configuration of the source driver 20.

Although source lines of one channel alone is shown in FIG. 2 to illustrate the circuit configuration of the source driver 20, in reality, as shown in FIG. 5, to each of the source lines of m channels (for example, m=720(=240×3RGB) in a QVGA color liquid crystal display panel), DACs 22-1 to **22-*m*, source drivers 23-1 to 23-*m* and selectors 25-1 to 25-*m*** are connected respectively.

On the other hand, the buffer amplifiers 24-1 and 24-2 for generating the first and second precharge voltages VLP1 and VLP2 are commonly used by all source lines, and thus two channels simply needs to be added. Accordingly, its increase in circuit scale accompanied by the addition of the buffer amplifiers 24-1 and 24-2 can mostly be ignored.

Next, the configuration and the operation of the common driver 30 will be described in detail.

Figure 6:
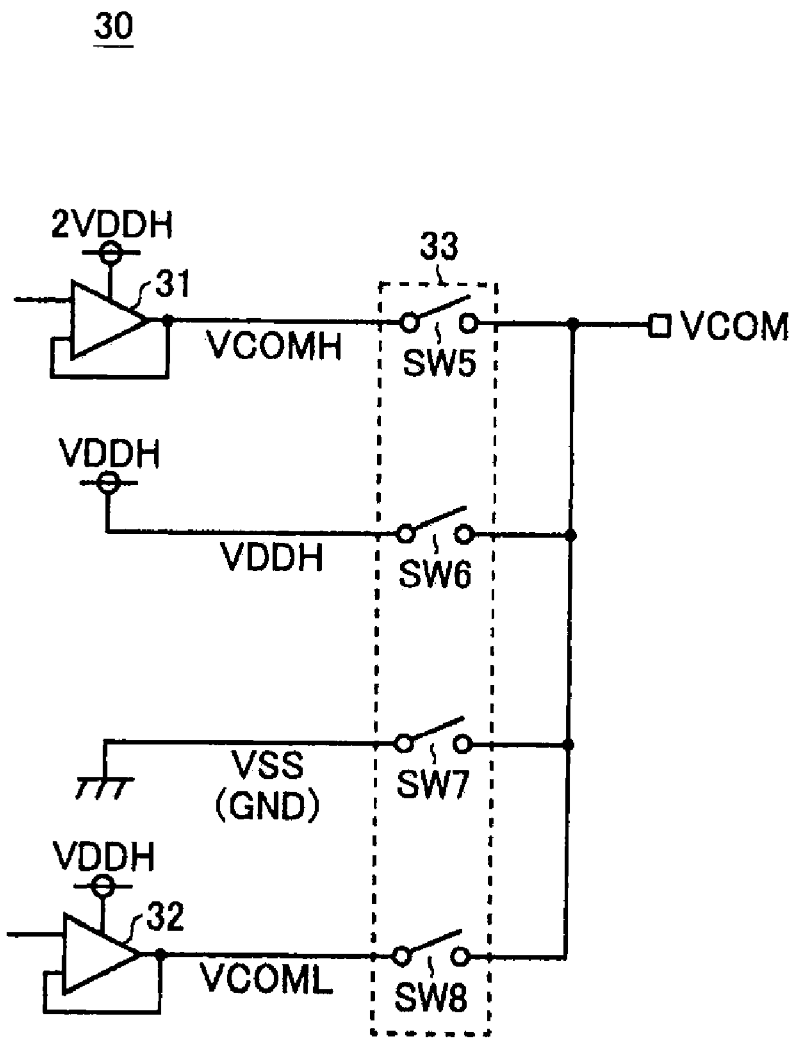
FIG. 6 A circuit diagram showing an example of the configuration of the common driver 30.

FIG. 6 is a circuit diagram showing an example of the configuration of the common driver 30.

As shown in FIG. 6, the common driver 30 of the configuration example has a positive common amplifier 31, a negative common amplifier 32, and a selector 33.

The positive common amplifier 31 is means that is driven by the boosted voltage 2VDDH and is for generating a predetermined positive voltage VCOMH (e.g., 3.6 [V]).

The negative common amplifier 32 is means that is driven by the supply voltage VDDH and is for generating a predetermined negative voltage VCOML (e.g., −1 [V]).

The selector 33 is means for selectively applying one of the positive voltage VCOMH, the supply voltage VDDH, the reference voltage VSS (the ground voltage GND), and the negative voltage VCOML described above to the liquid crystal display panel 100, and has switches SW5 to SW8. The switch SW5 is means for conducting/interrupting conduction between the application terminal of the positive voltage VCOMH (the output terminal of the common amplifier 31) and the output terminal of the common voltage VCOM. The switch SW6 is means for conducting/interrupting conduction between the application terminal of the supply voltage VDDH and the output terminal of the common voltage VCOM. The switch SW7 is means for conducting/interrupting conduction between the application terminal of the reference voltage VSS (the ground voltage GND) and the output terminal of the common voltage VCOM. The switch SW8 is means for conducting/interrupting conduction between the application terminal (the output terminal of the common amplifier 32) of the negative voltage VCOML and the output terminal of the common voltage VCOM.

Figure 7:
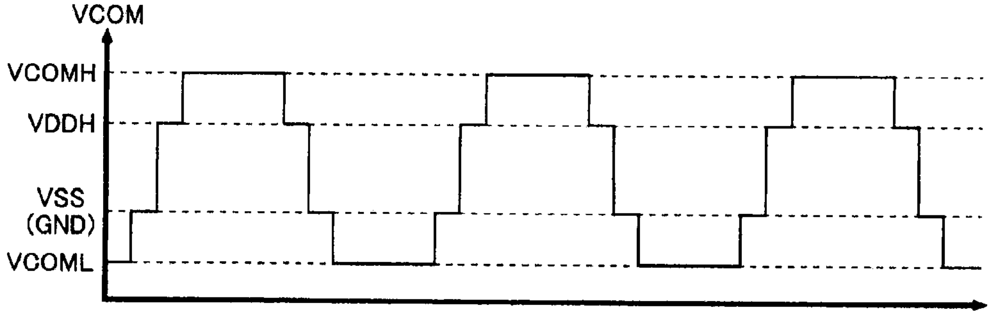
FIG. 7 A diagram illustrating the pulse drive of a common voltage VCOM.

FIG. 7 is a diagram illustrating the pulse drive of the common voltage VCOM, and shows the voltage waveform of the common voltage VCOM.

As shown in FIG. 7, the common driver 30 of the embodiment reverses the polarity of the common voltage VCOM at every horizontal period (e.g., 40 to 50 [μs]) (a so-called common AC drive system).

For example, in a 2.2 inch, QVGA liquid crystal display panel, a load capacity of about 11 [nF] is periodically applied with the common voltage VCOM with an amplitude of about 5 [V], so that the load capacity is repeatedly charged and discharged.

Here, on high-level transition of the common voltage VCOM (the level transition from the negative voltage VCOML to the positive voltage VCOMH), the common driver 30 of the embodiment applies the reference voltage VSS (the ground voltage GND) and the supply voltage VDDH one after the other, each for a predetermined period, prior to application of the positive voltage VCOMH (quaternary drive system).

More specifically, on high-level transition of the common voltage VCOM, first, via the switch SW7, the application terminal of the reference voltage VSS (the ground voltage GND) conducts the output terminal of the common voltage VCOM, and the voltage level of the common voltage VCOM rises from the negative voltage VCOML to the reference voltage VSS (the ground voltage GND). Then, via the switch SW6, the application terminal of the supply voltage VDDH conducts the output terminal of the common voltage VCOM, and the voltage level of the common voltage VCOM rises from the reference voltage VSS (the ground voltage GND) to the supply voltage VDDH. Lastly, via the switch SW5, the application terminal of the positive voltage VCOMH conducts the output terminal of the common voltage VCOM, and the voltage level of the common voltage VCOM rises from the supply voltage VDDH to the positive voltage VCOMH.

Specifically, the positive common amplifier 31 simply needs to charge the voltage difference between the supply voltage VDDH and the positive voltage VCOMH; thus, with respect to the level transition period from the reference voltage VSS (the ground voltage GND) to the supply voltage VDDH, by effective use of the supply voltage VDDH as is supplied from outside, current consumption can be reduced to half.

With this configuration, it is possible to minimize voltage application from the positive common amplifier 31, driven by the boosted voltage 2VDDH, to the liquid crystal display panel 100 and thereby reduce its electric power consumption.

Moreover, on adopting the quaternary drive system, the common driver 30 of the embodiment directly derives the supply voltage VDDH supplied from outside as the common voltage VCOM; thus, there is no need to provide a buffer amplifier and hence no increase in circuit scale.

As shown in FIG. 7, also on low-level transition of the common voltage VCOM (the level transition from the positive voltage VCOMH to the negative voltage VCOML), the common driver 30 of the embodiment applies the supply voltage VDDH and the reference voltage VSS (the ground voltage GND) one after the other, each for a predetermined period, prior to application of the negative voltage VCOML.

In this way, so long as the supply voltage VDDH is gone through on low-level transition of the common voltage VCOM, several hundred [μA] of current flows back from the output terminal of the common voltage VCOM to the application terminal (a circuit operating with the supply voltage as is, where several [m A] of current is constantly consumed) of the supply voltage VDDH; thus, it is possible to further reduce the electric power consumption.

When priority is given to enhancing stability of the supply voltage VDDH over reducing electric power consumption, switching of the selector 33 may be controlled by resistor setting such that the supply voltage VDDH is not gone through on low-level transition of the common voltage VCOM.

Next, with reference to FIG. 8, the circuit configuration of the selector 33 will be described in detail.

Figure 8:
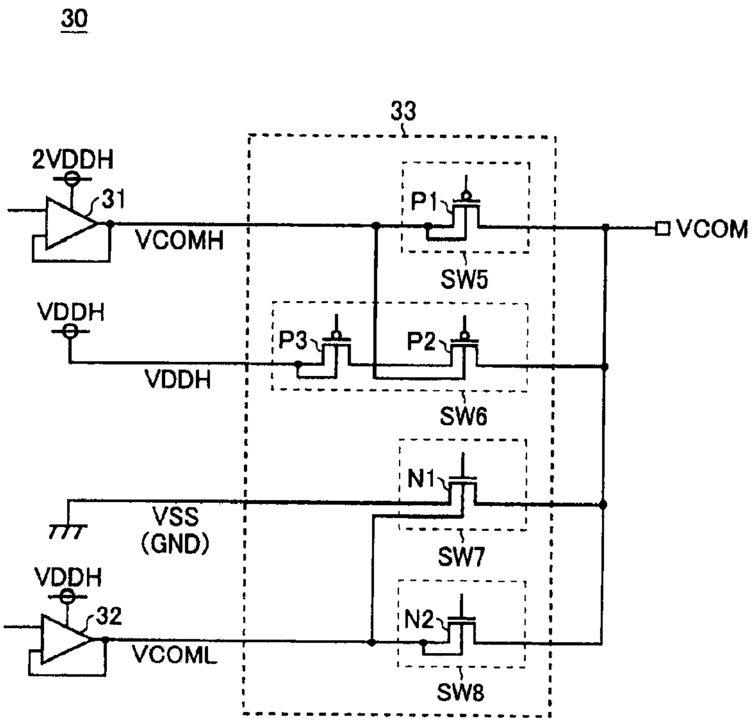
FIG. 8 A circuit diagram showing an example of the configuration of a selector 33.
Figure 9:
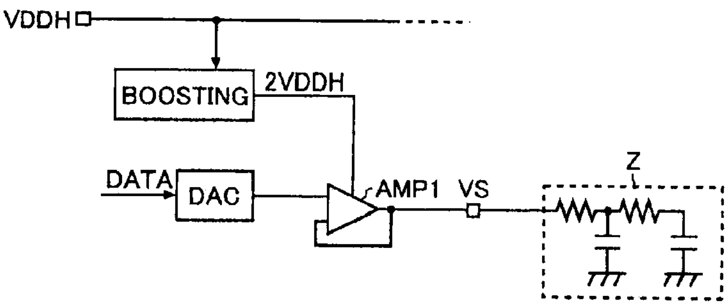
FIG. 9 A circuit diagram showing an example of a conventional source driver.
Figure 10:
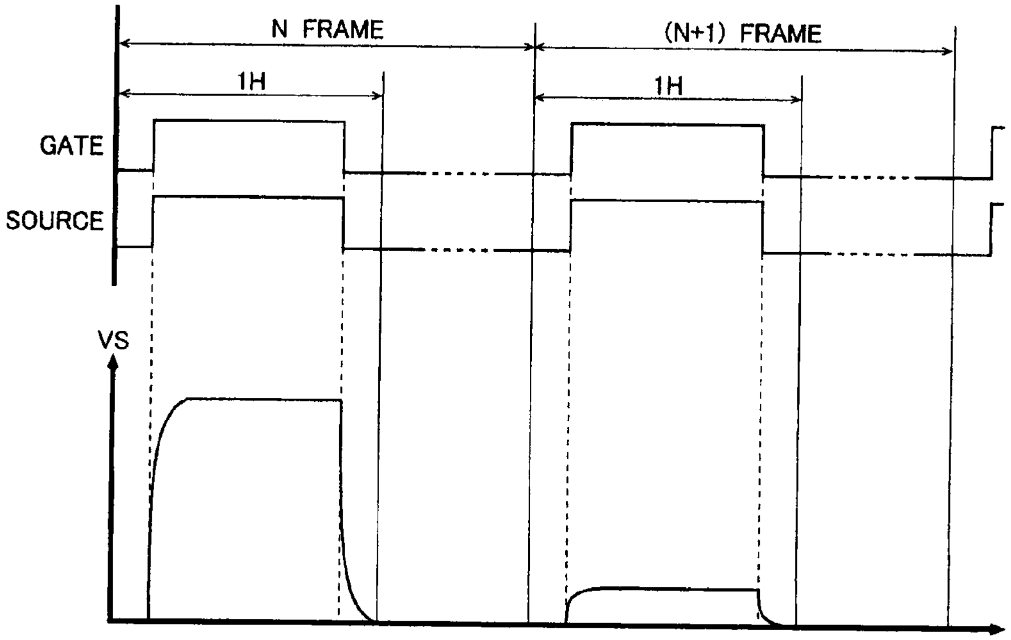
FIG. 10 A diagram illustrating the conventional pulse drive of a source voltage.
Figure 11:
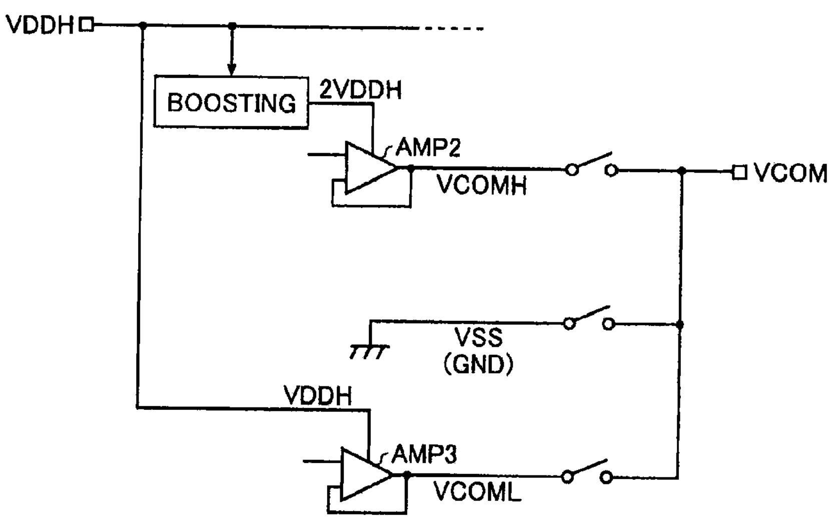
FIG. 11 A circuit diagram showing an example of a conventional common driver.
Figure 12:
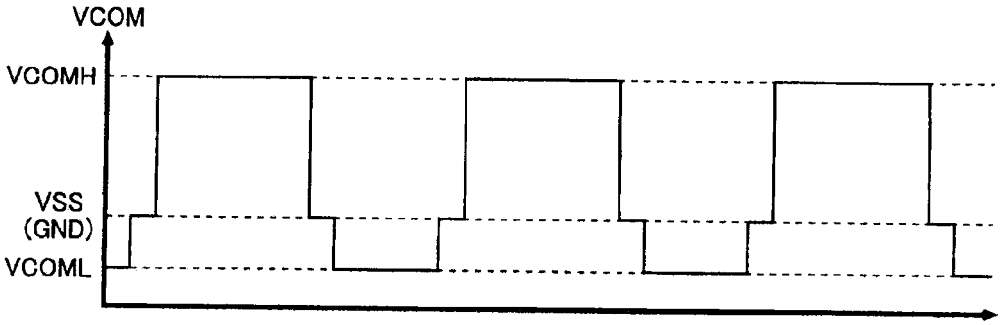
FIG. 12 A diagram illustrating the conventional pulse drive of a common voltage.

FIG. 8 is a circuit diagram showing an example of the configuration of the selector 33.

As shown in FIG. 8, the selector 33 of the configuration example has a p-channel field effect transistor P1 as the switch SW5, p-channel field effect transistors P2 and P3 as the switch SW6, an n-channel field effect transistor N1 as the switch SW7, and an n-channel field effect transistor N2 as the switch SW8.

The source and the backgate of the transistor P1 are connected to the application terminal (the output terminal of the common amplifier 31) of the positive voltage VCOMH. The drain of the transistor P1 is connected to the output terminal of the common voltage VCOM.

The source of the transistor P2 is connected to the drain of the transistor P3. The drain of the transistor P2 is connected to the output terminal of the common voltage VCOM. The backgate of the transistor P2 is connected to the application terminal (the output terminal of the common amplifier 31) of the positive voltage VCOMH. The source and the backgate of the transistor P3 are connected to the application terminal of the supply voltage VDDH. Connected to the output terminal of the common voltage VCOM.

The source of the transistor N1 is connected to the application terminal of the reference voltage VSS (the ground voltage GND). The backgate of the transistor N1 is connected to the application terminal (the output terminal of the common amplifier 32) of the negative voltage VCOML. The drain of the transistor N1 is connected to the output terminal of the common voltage VCOM.

The source and the backgate of the transistor N2 are connected to the application terminal (the output terminal of the common amplifier 32) of the negative voltage VCOML. The drain of the transistor N2 is connected to the output terminal of the common voltage VCOM.

Hereinafter, a description will be given of the reason for providing the transistor P3 in addition to the transistor P2 as the switch SW6.

While the liquid crystal drive device 200 is in a stand-by state etc., when the boosting circuit 40 is brought into a non-driving state and thereby no boosted voltage 2VDDH is being supplied, the output voltage level of the positive common amplifier 31 drops to the reference voltage VSS (the ground voltage GND). Here, if the transistor P3 is not provided, the gate of the transistor P2 will be indeterminate, the backgate thereof will be the reference voltage VSS (the ground voltage GND), and the source thereof will be the supply voltage VDDH, and thus the transistor P2 will be on always, resulting in the liquid crystal display panel 100 being continuously applied with unintended common voltage VCOM.

Thus, in the selector 33 of the configuration example, the transistor P3, of which the backgate is applied with the supply voltage VDDH, is provided in addition to the transistor P2 as the switch SW6. The transistor P3 is always on during normal operation of the liquid crystal drive device 200, and is off only while in a standby state.

With this configuration, even when the liquid crystal drive device 200 is in a standby state, by use of the transistor P3, the current path described above can be surely interrupted; it is therefore possible to adopt, without any problem, the configuration of the embodiment in which the supply voltage VDDH supplied from outside is directly derived as the common voltage VCOM.

It should be understood that the configuration of present invention may be carried out in any manner other than specifically described above as an embodiment, and many modifications and variations are possible within the scope and spirit of the present invention.

INDUSTRIAL APPLICABILITY

The present invention offers technology that is useful for reducing the electric power consumption of the liquid crystal drive device and the liquid crystal display device employing such a liquid crystal drive device.

The invention claimed is:

1. A liquid crystal drive device comprising:

a gate driver applying a gate voltage to a liquid crystal display panel of an active matrix type;

a source driver applying a source voltage to the liquid crystal display panel;

a common driver applying a common voltage to the liquid crystal display panel; and a boosting circuit generating a desired boosted voltage from a supply voltage, wherein, on application of the source voltage and high-level transition of the common voltage, at least one of the source driver and the common driver performs voltage application using the supply voltage prior to voltage application using the boosted voltage, wherein the source driver comprises:

a source amplifier generating a data voltage corresponding to a halftone value of input data by use of the boosted voltage;

a buffer amplifier generating a predetermined precharge voltage by use of the supply voltage; and a selector selectively applying one of the data voltage and the precharge voltage to the liquid crystal display panel, wherein, on application of the source voltage, the selector applies the precharge voltage, for a predetermined period, prior to application of the data voltage.

2. The liquid crystal drive device according to claim 1, wherein the source driver reverses polarity of the source voltage at every frame.

3. The liquid crystal drive device according to claim 1, wherein the source driver comprises, as the buffer amplifier, a plurality of them as means for generating a plurality of different precharge voltages by use of the supply voltage, wherein the selector selects, according to the halftone value of input data, a precharge voltage to be applied prior to the data voltage.

4. The liquid crystal drive device according to claim 2, wherein the source driver comprises, as the buffer amplifier, a plurality of them as means for generating a plurality of different precharge voltages by use of the supply voltage, wherein the selector selects, according to the halftone value of input data, a precharge voltage to be applied prior to the data voltage.

5. The liquid crystal drive device according to claim 1, wherein the common driver comprises:

a positive common amplifier generating a predetermined positive voltage by use of the boosted voltage;

a negative common amplifier generating a predetermined negative voltage by use of the supply voltage; and a selector selectively applying one of the positive voltage, the supply voltage, a ground voltage, and the negative voltage to the liquid crystal display panel, wherein, on high-level transition of the common voltage, the selector applies the ground voltage and the supply voltage one after the other, each for a predetermined period, prior to application of the positive voltage.

6. The liquid crystal drive device according to claim 5, wherein, on low-level transition of the common voltage, the selector applies the supply voltage and the ground voltage one after the other, each for a predetermined period, prior to application of the negative voltage.

7. The liquid crystal drive device according to claim 5, wherein the selector comprises, as switching means for conducting/interrupting conduction between an application terminal of the supply voltage and an output terminal of the common voltage:

a first p-channel field effect transistor of which a drain is connected to the output terminal of the common voltage and a backgate is connected to the application terminal of the positive voltage; and a second p-channel field effect transistor of which a drain is connected to a source of the first p-channel field effect transistor and a source and a backgate are connected to the application terminal of the supply voltage.

8. The liquid crystal drive device according to claim 6, wherein the selector comprises, as switching means for conducting/interrupting, conduction between an application terminal of the supply voltage and an output terminal of the common voltage:

a first p-channel field effect transistor of which a drain is connected to the output terminal of the common voltage and a backgate is connected to the application terminal of the positive voltage; and a second p-channel field effect transistor of which a drain is connected to a source of the first p-channel field effect transistor and a source and a backgate are connected to the application terminal of the supply voltage.

9. A liquid crystal display device comprising:

a liquid crystal display panel of the active matrix type; and the liquid crystal drive device according to claim 1 as means for driving the liquid crystal display panel.

10. A liquid crystal drive device comprising:

a gate driver applying a gate voltage to a liquid crystal display panel of an active matrix type;

a source driver applying a source voltage to the liquid crystal display panel;

a common driver applying a common voltage to the liquid crystal display panel; and a boosting circuit generating a desired boosted voltage from a supply voltage, wherein, on application, of the source voltage and high-level transition of the common voltage, at least one of the source driver and the common driver performs voltage application using the supply voltage prior to voltage application using the boosted voltage, wherein the common driver comprises:

a positive common amplifier generating a predetermined positive voltage by use of the boosted voltage;

a negative common amplifier generating a predetermined negative voltage by use of the supply voltage; and a selector selectively applying one of the positive voltage, the supply voltage, a ground voltage, and the negative voltage to the liquid crystal display panel, wherein, on high-level transition of the common voltage, the selector applies the ground voltage and the supply voltage one after the other, each for a predetermined period, prior to application of the positive voltage, wherein the selector comprises, as first switching means for conducting/interrupting conduction between an application terminal of the supply voltage and an output terminal of the common voltage:

a first p-channel field effect transistor of which a drain is connected to the output terminal of the common voltage and a backgate is connected to the application terminal of the positive voltage; and a second p-channel field effect transistor of which a drain is connected to a source of the first p-channel field effect transistor and a source and a backgate are connected to the application terminal of the supply voltage, and wherein the selector comprises, as a second switching means for conducting/interrupting conduction between the application terminal of the positive voltage and the output terminal of the common voltage:

a third p-channel field effect transistor of which a drain is connected to the output terminal of the common voltage and a source and a backgate are connected to the application terminal of the positive voltage.

11. The liquid crystal drive device according to claim 10, wherein, on low-level transition of the common voltage, the selector applies the supply voltage and the ground voltage one after the other, each for a predetermined period, prior to application of the negative voltage.

12. A liquid crystal display device comprising:

a liquid crystal display panel of the active matrix type; and the liquid crystal drive device according to claim 10 as means for driving the liquid crystal display panel.

* * * * *